United States Patent
Lai et al.

(10) Patent No.: US 9,300,162 B2
(45) Date of Patent: Mar. 29, 2016

(54) WIRELESS CHARGING STORAGE STAND

(71) Applicant: AUDEN TECHNO CORP., Taoyuan County (TW)

(72) Inventors: Shih-Chi Lai, Miaoli County (TW); Peng-Hao Juan, Taipei City (TW)

(73) Assignee: AUDEN TECHNO CORP., Taoyuan (TW)

(*) Notice: Subject to any disclaimer, the term of this patent is extended or adjusted under 35 U.S.C. 154(b) by 340 days.

(21) Appl. No.: 14/081,705

(22) Filed: Nov. 15, 2013

(65) Prior Publication Data

US 2015/0137732 A1 May 21, 2015

(51) Int. Cl.
*H02J 7/00* (2006.01)
*H02J 7/02* (2006.01)
*H02J 7/35* (2006.01)

(52) U.S. Cl.
CPC ............... *H02J 7/025* (2013.01); *H02J 7/0021* (2013.01); *H02J 7/0027* (2013.01); *H02J 7/0047* (2013.01); *H02J 7/35* (2013.01)

(58) Field of Classification Search
CPC .................................. H02J 5/005; H02J 7/025
USPC ................... 320/107–108, 110–115
See application file for complete search history.

(56) References Cited

U.S. PATENT DOCUMENTS 8,531,153 B2 * 9/2013 Baarman ................. H02J 5/005
320/108

* cited by examiner

*Primary Examiner* — Paul Dinh
(74) *Attorney, Agent, or Firm* — Li & Cai Intellectual Property (USA) Office

(57) ABSTRACT

The present disclosure provides a wireless charging storage stand comprising a body and a power control circuit. The body has a plurality of containing portions. Each containing portion comprises a wireless charging unit, a wireless charging indication unit and a sensing circuit. The wireless charging unit is coupled to the wireless charging indication unit. The containing portion is for accommodating an electronic device with wireless charging capability which is charged by the wireless charging unit. The wireless charging indication unit generates a charging indication signal according to the charging status of the wireless charging unit. The power control circuit is disposed in the body and the power control circuit is coupled to the plurality of wireless charging units and the plurality of wireless charging indication units. The power control circuit provides electric power to the plurality of wireless charging units and the plurality of wireless charging indication units.

10 Claims, 4 Drawing Sheets

WIRELESS CHARGING STORAGE STAND

BACKGROUND OF THE INVENTION

1. Field of the Invention

The instant disclosure relates to a storage stand; in particular, to a wireless charging storage stand.

2. Description of Related Art

Existing article storage stand (or rack), such as the toy storage stand, only provides article storage function. No matter what types of the articles are, the user could utilize a storage stand with an appropriate size corresponding to the size of each article to store the article. Existing article storage stand only provides the function of storage or the function of storing in categories.

Due to diversity of the present electronic devices, small electronic equipment such as electronic toys, handheld electronic game consoles, mobile phones or tablet computers have been in common use for everyday life. Each electronic device needs electricity, thus the electronic devices may incorporated with batteries for convenience. Meanwhile, the batteries may be secondary batteries, thus when the batteries are out of electricity, the batteries could be recharged in order to make the electronic devices use the batteries to operate again. However, the user demands for storing the electronic devices in categories, placing the electronic devices on display and charging process of the electronic devices may not the same. The user usually needs to charge each electronic device independently and check the charging status of each electronic device, thus it is inconvenient for the user to manage all of the electronic devices. Especially for the users which are children, the children usually may not have sufficient knowledge of the electronic devices (for example, the electronic toys) for using the electronic devices. The children may place the electronic devices as their pleases without remembering to charge the electronic devices. When the children want to use the electronic devices again, they may not easy to find out the electronic devices. Or, the children may forget to charge the electronic devices in advance until they want to use the electronic devices again.

SUMMARY OF THE INVENTION

The object of the instant disclosure is to provide a wireless charging storage stand which accommodates a plurality of electronic devices with wireless charging capability by using a plurality of containing portions. The wireless charging storage stand charges the plurality of electronic devices with wireless charging capability at the same time. Each containing portion displays a charging indication signal representing the charging status.

In order to achieve the aforementioned objects, according to an embodiment of the instant disclosure, a wireless charging storage stand is offered. The wireless charging storage stand comprises a body and a power control circuit. The body has a plurality of containing portions. Each containing portion comprises a wireless charging unit, a wireless charging indication unit and a sensing circuit. The wireless charging unit is coupled to the wireless charging indication unit. The containing portion is for accommodating an electronic device with wireless charging capability. The sensing circuit senses a sensing signal generated by the electronic device with wireless charging capability. The electronic device with wireless charging capability is charged by the wireless charging unit. The wireless charging indication unit generates a charging indication signal according to the charging status of the wireless charging unit. The power control circuit is disposed in the body, and is coupled to the plurality of wireless charging units, the plurality of wireless charging indication units and the plurality of sensing circuits, for providing electric power to the plurality of wireless charging units and the plurality of wireless charging indication units, and receiving the sensing signals from the plurality of sensing circuits.

In summary, the wireless charging storage stand accommodates a plurality of electronic devices with wireless charging capability and charges the plurality of electronic devices with wireless charging capability at the same time. When the electronic device with wireless charging capability is fully charged, the user could know the charging for the electronic device with wireless charging capability is completed through the charge completion signal. The user could get into the habit of putting the electronic device back where the electronic device was stored for charging the electronic device after using the electronic device. Meanwhile, the charging process could be automatically completed without any manual settings.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[An Embodiment of the Wireless Charging Storage Stand]

Figure 1A:
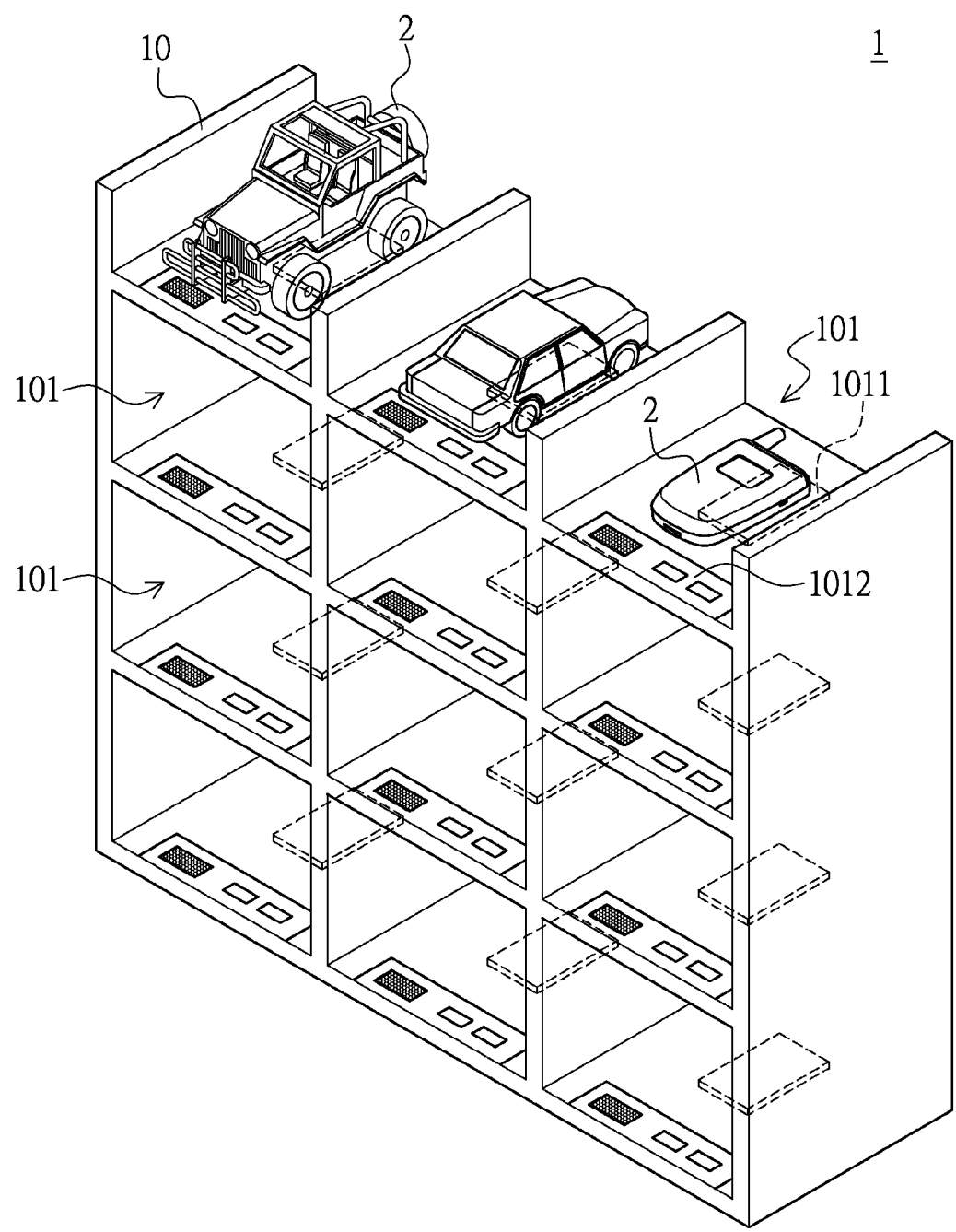
FIG. 1A shows a schematic diagram of a wireless charging storage stand according to an embodiment of the instant disclosure.
Figure 1B:
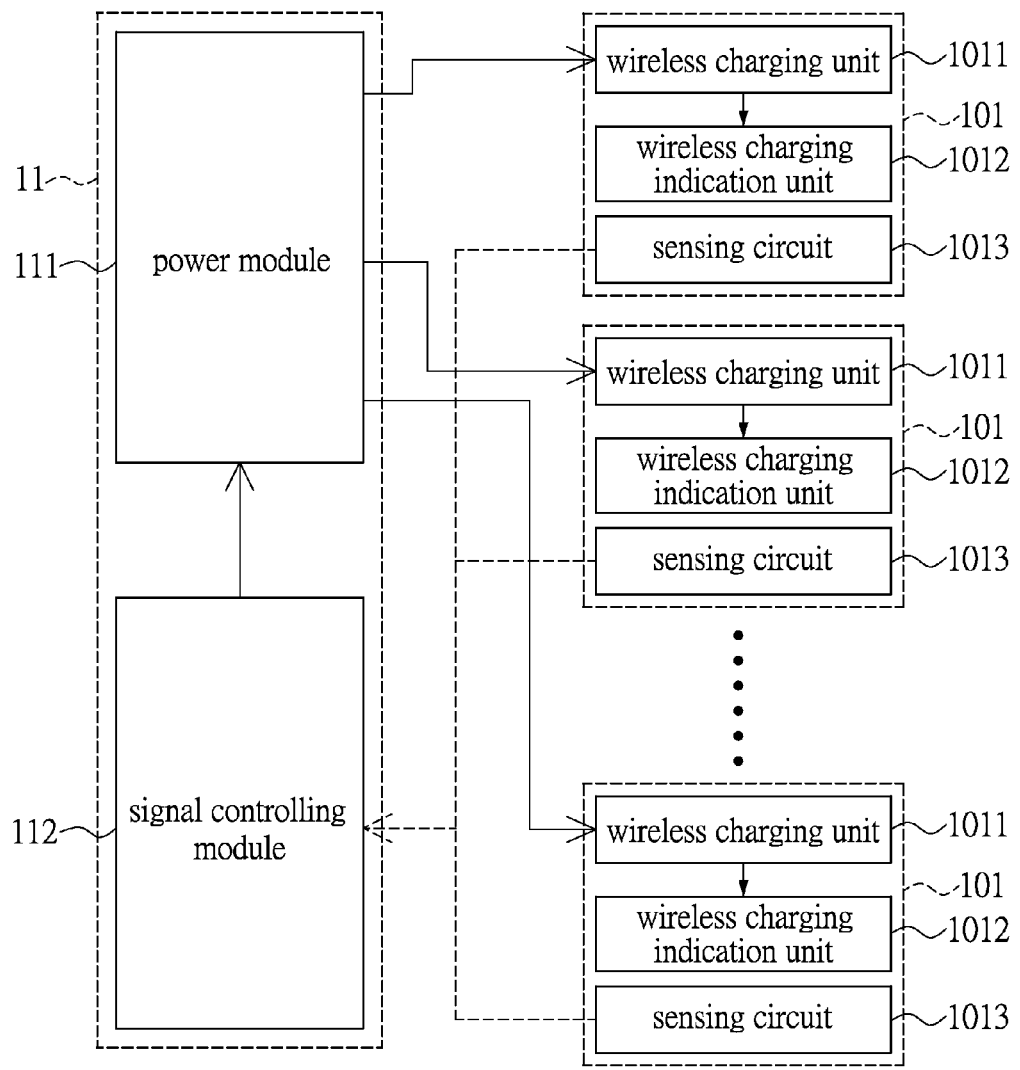
FIG. 1B shows a block diagram of a wireless charging storage stand according to an embodiment of the instant disclosure.

Please refer to FIG. 1A in conjunction with FIG. 1B, FIG. 1A shows a schematic diagram of a wireless charging storage stand according to an embodiment of the instant disclosure, and FIG. 1B shows a block diagram of a wireless charging storage stand according to an embodiment of the instant disclosure. The wireless charging storage stand 1 is for storing a plurality of electronic devices with wireless charging capability 2. The wireless charging storage stand 1 comprises a body 10 and a power control circuit 11. The body 10 has a plurality of containing portions 101. Each containing portion 101 is for accommodating an electronic device with wireless charging capability 2. Each containing portion 101 comprises a wireless charging unit 1011, a wireless charging indication unit 1012 and a sensing circuit 1013 (not shown in FIG. 1A). The power control circuit 11 (not shown in FIG. 1A) is disposed in the body 10. The power control circuit 11 comprises a power module 111 and a signal controlling module 112.

As shown in FIG. 1A, the body 10 may be in a bookshelf form, a bookcase form or other kinds of storage stand (or rack) as long as the body 10 has a plurality of containing portions 101. However, the shape of the body 10 is not restricted thereto. The containing portions 101 may be the open type or the closed type. For example, the three containing portions 101 on the top of the body 10 shown in FIG. 1A are the open type. Meanwhile, each of the else containing portions 101 of the body 10 shown in FIG. 1A has an opening just in one lateral side of the containing portion 101; meanwhile, other sides are closed. Besides, the lateral opening of the containing portion 101 may configured with a door (not shown in FIG. 1A), in order to make the containing portion 101 be a closed structure. The containing portion 101 may be arranged on the body 10 in any order. The user could put the electronic devices with wireless charging capability 2 into the containing portions 101 conveniently. Meanwhile, the user could also take the electronic devices with wireless charging capability 2 from the containing portions 101 conveniently.

In this embodiment, the electronic device with wireless charging capability 2 may be any electronic toy, and the electronic toy has a secondary battery and a wireless charging module. The secondary battery could be charged through the wireless charging module. For example, the wireless charging module of the electronic toy may be the magnetic inductive charging module or the magnetic resonance charging module. However, it is not intended to limit the scope of the present disclosure. The electronic device with wireless charging capability 2 may also be the small electronic equipment, such as a handheld electronic game console, a mobile phones or a tablet computer.

Please refer to FIG. 1B again. The power module 111 is for providing electricity to the plurality of wireless charging units 1011 and the plurality of wireless charging indication units 1012. The wireless charging unit 1011 of each containing portion 101 is coupled to a wireless charging indication units 1012. The power module 111 of the power control circuit 11 is coupled to the plurality of wireless charging units 1011 and the plurality of. The signal controlling module 112 of the power control circuit 11 is coupled to the plurality of sensing circuits 1013. When the electronic device with wireless charging capability 2 (or so called the wireless charging under test) is displaced into the containing portion 101, and the sensing circuit 1013 senses the electronic device with wireless charging capability 2 through generating a wireless signal (the sensing circuit 1013 senses a sensing signal of the electronic device with wireless charging capability 2), the sensing circuit 1013 feedbacks the sensing signal to the signal controlling module 112. Then, the signal controlling module 112 sends a command to the power module 11 for transmitting electricity to the wireless charging unit 1011 for wireless charging of the electronic device with wireless charging capability 2. The wireless charging indication unit 1012 provides information to the user to know whether the charging process is completed or not. Besides, the position of the sensing circuit 1013 can be determined arbitrarily in the containing portion 101 as needed in practical applications. The sensing circuit 1013 could be any device or element, such as a sensing coil (or antenna), or a light sensor, for sensing the electronic device with wireless charging capability 2.

In other words, the signal controlling module 112 controls the power module 111 according to the sensing signal (feedback signal) of the sensing circuit 1013, thus the power module 111 provides electricity to the wireless charging unit 1011. The electronic device with wireless charging capability 2 is charged through the wireless charging unit 1011. The wireless charging indication unit 1012 generates a charging indication signal according to the charging status of the wireless charging unit 1011. When the wireless charging unit 1011 charges the electronic device with wireless charging capability 2, the wireless charging indication unit 1012 may generate the charging indication signal. Meanwhile, the sensing circuit 1013 in each containing portion 101 could determine whether to provide electricity to the wireless charging unit 1011, in order to avoid unnecessary waste of electricity.

The power control circuit 11 comprises a voltage converter, and the voltage converter may be a boost converter or a buck converter. The power control circuit 11 may be connected to an exterior power source (e.g. household electricity), or the power control circuit 11 could comprise a secondary battery for storing electricity. In other words, the power control circuit 11 receives exterior electricity and also stores the received electricity.

More specifically, the wireless charging unit 1011 has a coil (or any other element could generates electromagnetic field) and a charging control circuit. The charging control circuit provides electricity to the coil for generating the electromagnetic field which is used for charging. When the electronic device with wireless charging capability 2 is placed in the containing portion 101, the wireless charging indication unit 1011 of the containing portion 101 utilizes the coil to provide electricity which is form the power control circuit 11 to the electronic device with wireless charging capability 2. In this embodiment, the wireless charging unit 1011 is a magnetic inductive charging unit or a magnetic resonance charging unit, but the present disclosure is not so restricted. The wireless charging unit 1011 and the electronic device with wireless charging capability 2 do not need to touch each other.

The manner of determining the charging status of the wireless charging unit 1011 for the wireless charging indication unit 1012 could be sensing the current in the coil of the wireless charging unit 1011. Alternatively, the charging control circuit of the wireless charging unit 1011 and the electronic device with wireless charging capability 2 could transmit charging information to each other, then the wireless charging indication unit 1012 receives the sensing signal from the wireless charging unit 1011. The instant disclosure does not restrict the wireless charging unit 1011 need to receive the signal from the electronic device with wireless charging capability 2. The instant disclosure does not restrict the manner of determining the charging status of the wireless charging unit 1011 for the wireless charging indication unit 1012.

The charging indication signal generated by the wireless charging indication unit 1012 may be, for example, a light signal or a sound signal, but the instant disclosure is not so restricted. Besides, when the electronic device with wireless charging capability 2 is fully charged, the wireless charging indication unit 1012 generates a charging completion signal to prompt the user. For example, the children could identify whether the electronic toy is fully charged through observing the light signal or the sound signal representing the fully charged information.

[Another Embodiment of the Wireless Charging Storage Stand]

Figure 2:
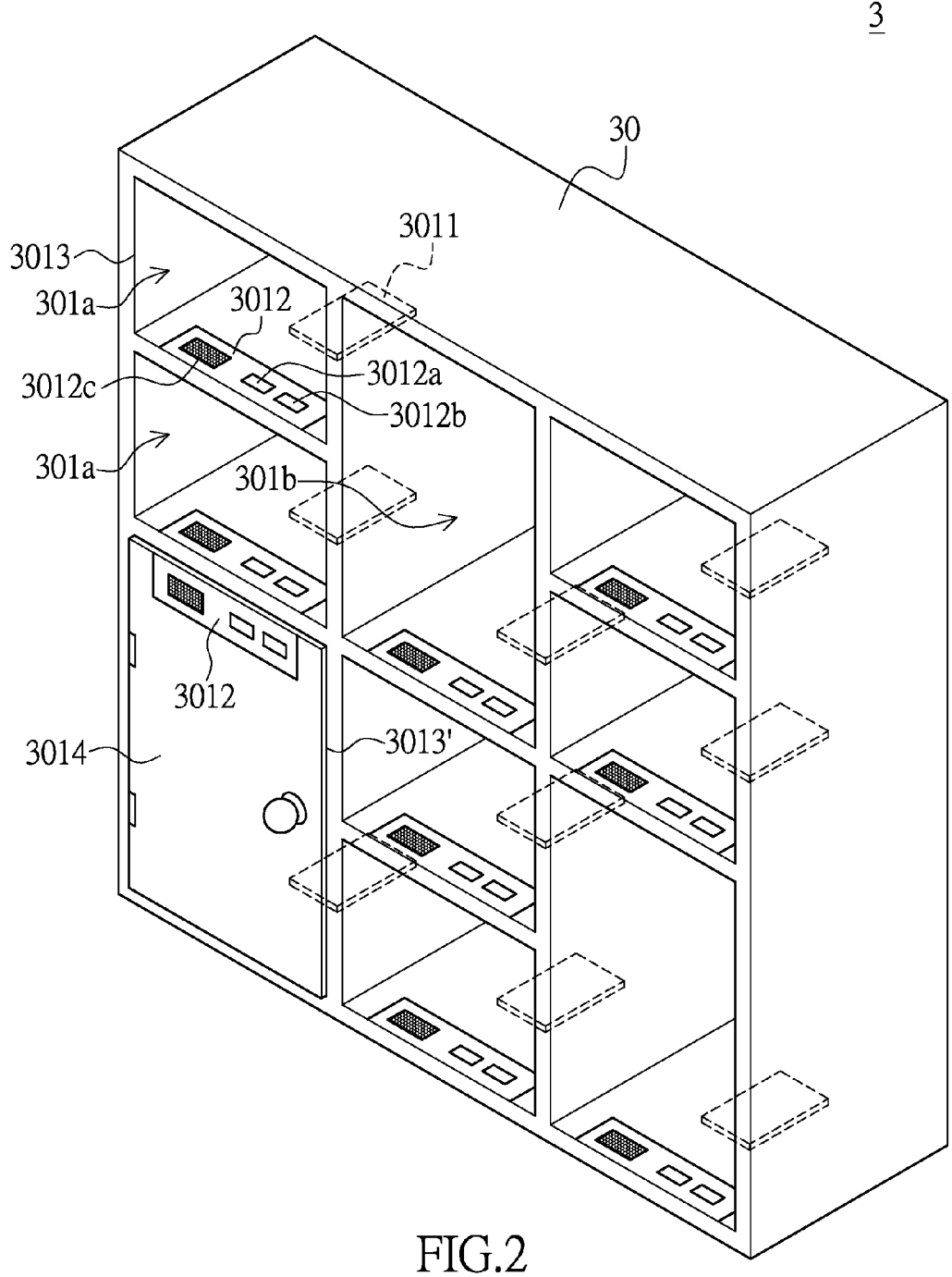
FIG. 2 shows a schematic diagram of a wireless charging storage stand according to another embodiment of the instant disclosure.

Please refer to FIG. 1A in conjunction with FIG. 1B and FIG. 2, FIG. 2 shows a schematic diagram of a wireless charging storage stand according to another embodiment of the instant disclosure. The wireless charging storage stand 3 is used for accommodating a plurality of electronic devices with wireless charging capability 2. The wireless charging storage stand 3 comprises a body 30 and a power control circuit (which is the same as the power control circuit 11 shown in FIG. 1B; not shown in FIG. 2). The body 30 has a plurality of containing portions 301a, 301b. Each containing portion 301a (or 301b) is for accommodating one or a plurality of electronic devices with wireless charging capability 2. Each containing portion 301a (or 301b) comprises a wireless charging unit 3011, a wireless charging indication unit 3012, a sensing circuit (i.e. the sensing circuit 1013 shown in FIG. 1B; not shown in FIG. 2) and an electromagnetic shielding 3013. The size of each containing portion 301a (or 301b) may not the same.

The wireless charging storage stand 3 is significantly identical to the wireless charging storage stand 1 shown in FIG. 1 except for the arrangement order, the size and the structure of the containing portion 301a (or 301b), and the electromagnetic shielding 3013. The wireless charging unit 3011 is disposed in the electromagnetic shielding 3013. The electronic device with wireless charging capability 2 is for being disposed in the electromagnetic shielding 3013. Usually, during the process of wireless charging, the electromagnetic field generating by wireless charging could extend to surroundings of the wireless charging unit 3011. The energy of the wireless charging unit 3011 could leaks out of the corresponding containing portion 301a (or 301b), thus the charging efficiency could be lowered. Meanwhile, other electronic devices outside of the corresponding containing portion 301b (or 301b) may be interfered. The electromagnetic shielding 3013 confines the electromagnetic field generated during the wireless charging process to the corresponding containing portion 301a (or 301b). Thus, the wireless charging indication unit 3011 only charges the electronic device with wireless charging capability 2 stored in the corresponding containing portion 301a (or 301b), and electronic devices outside of the containing portion 301a (or 301b) would not be affected. Thus, the charging efficiency and the safety could be improved. The shape of the electromagnetic shielding 3013 could be designed according the containing portion 301a (or 301b), as long as the electromagnetic shielding 3013 is sufficient to accommodate the electronic device with wireless charging capability 2. Alternatively, the electromagnetic shielding 3013 may be semi-closed, the electromagnetic shielding 3013 only has an opening corresponding to the opening of the containing portion 301a (or 301b). When the containing portion 301a (or 301b) is a totally enclosed structure (for example, the containing portion 301a (or 301b) has a door which can be closed), the electromagnetic shielding 3013 may also be designed to be totally enclosed. For example, as shown in FIG. 2, one containing portion 301b has a cover 3014 (which is a closed door of the containing portion 301b) in order to totally enclose the containing portion 301b. Meanwhile, the wireless charging indication unit 3012 could be designed on the cover 3014. The cover 3014 could be a part of the electromagnetic shielding, in which the electromagnetic shielding 3013' is totally enclosed. The added cover 3014 could avoid leakage of energy for improving the charging efficiency and the electromagnetic safety.

This embodiment further describes the wireless charging indication unit 3012. The wireless charging indication unit 3012 could be a display, such as a liquid crystal display (LCD) or an electronic paper. The charging indication signal could be displayed by the display, thus the user could watch the charging status. The wireless charging indication unit 3012 may comprise at least one light emitting element 3012a, 3012b and a speaker 3012c, as shown in FIG. 2. In this embodiment, the light emitting element 3012a of the wireless charging indication unit 3012 is used for indicating that the wireless charging unit 3011 is charging the electronic device with wireless charging capability 2, and the light emitting element 3012 may display red light. The light emitting element 3012b of the wireless charging indication unit 3012 is used for indicating that the electronic device with wireless charging capability 2 has been fully charged by the wireless charging unit 3011, and the light emitting element 3012 may display green light. When the user discovers that the wireless charging indication unit 3012 of the corresponding containing portion 301a (or 301b) is displaying red light, it means the electronic device with wireless charging capability 2 in the corresponding containing portion 301a (or 301b) is being charged. When the user discovers that the wireless charging indication unit 3012 of the corresponding containing portion 301a (or 301b) is displaying green light, the user could take the electronic device with wireless charging capability 2 out of the corresponding containing portion 301a (or 301b) for using.

Additionally, the speaker 3012c could send a first sound (or music) when the wireless charging unit 3011 is charging the electronic device with wireless charging capability 2. And, the speaker 3012c could send a second sound (or music) when the electronic device with wireless charging capability is fully charged. Thus, the user could identify the charging status according to sense of hearing.

When the user is a child, by watching the light signal representing fully charged (e.g. green light) or hearing the sound of the speaker 3012c, the child could easily know when the electronic device with wireless charging capability 2 could be used again. When the electricity of the electronic device with wireless charging capability 2 is exhausted or the child does not want to use the electronic device with wireless charging capability 2, the child could place the electronic device with wireless charging capability 2 into the containing portion (301a or 301b) of the wireless charging storage stand 3, for getting into the habit of putting the electronic device 2 back where the electronic device 2 was stored. The children could easily to develop the habit of usage, because when the children do not place the electronic device with wireless charging capability 2 into the containing portion 301a (or 301b) after using the electronic device with wireless charging capability 2, the electronic device with wireless charging capability 2 may not have enough electricity to operate in the next time when the children want to use it. When the electronic devices with wireless charging capability 2 are toys, the children could watch the containing portions 301a, 301b of the wireless charging storage stand 3 in order to identify which containing portion 301a (or 301b) is emitting light signal representing fully charged status. Then, the children could take the toy out from the corresponding containing portion 301a (or 301b) for playing. The wireless charging storage stand 3 provides a mechanism for automatically charging and displaying the charging status, thus the children could develop the habit of storage articles when using the toys.

[Another Embodiment of the Wireless Charging Storage Stand]

Figure 3:
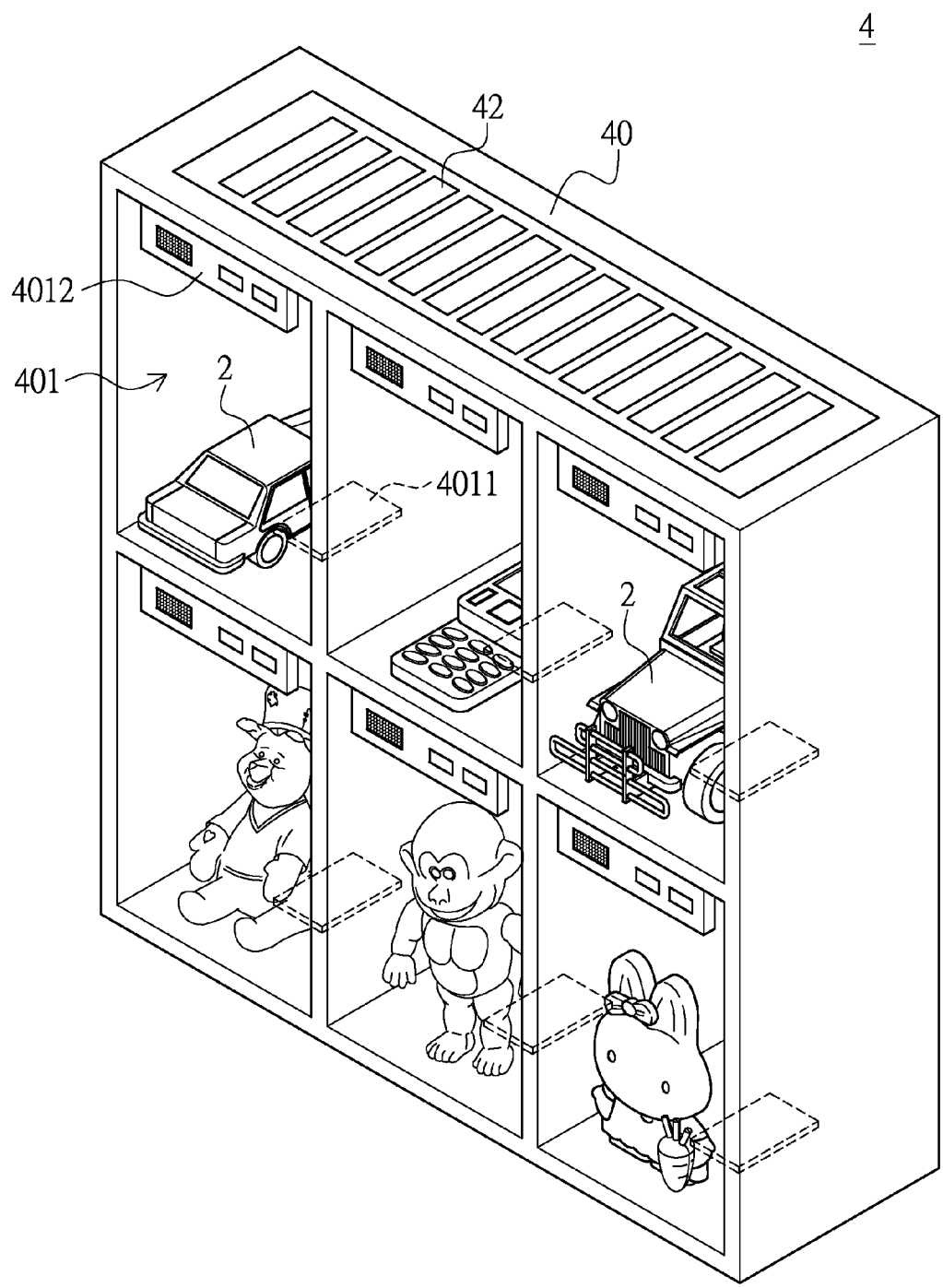
FIG. 3 shows a schematic diagram of a wireless charging storage stand according to another embodiment of the instant disclosure.

Please refer to FIG. 3 showing a schematic diagram of a wireless charging storage stand according to another embodiment of the instant disclosure. The wireless charging storage stand 4 is for accommodating a plurality of electronic devices with wireless charging capability 2. The wireless charging storage stand 4 comprises a body 40, a solar charging module 42 and a power control circuit (which is the same as the power control circuit 11 shown in FIG. 1B; not shown in FIG. 3). The body 40 has a plurality of containing portion 401. Each containing portion 401 is for accommodating one electronic device with wireless charging capability 2. Each containing portion 401 comprises a wireless charging unit 4011, a wireless charging indication unit 4012 and a sensing circuit (i.e. the sensing circuit 1013 shown in FIG. 1B; not shown in FIG. 2).

The wireless charging storage stand 4 is significantly identical to the wireless charging storage stand 1 shown in FIG. 1 except for the solar charging module 42 and difference positions of the wireless charging indication units 4012. The wireless charging indication unit 4012 may be disposed on one opening of the containing portion 401 or on one side of the containing portion 401. The instant disclosure does not restrict the appearance and the structure of the wireless charging indication unit 4012.

The wireless charging storage stand 4 of this embodiment could be placed to outdoors. Usually, it is not convenient to obtain electricity at outdoors. The wireless charging storage stand 4 harvests solar energy and converts solar energy to electricity, thus the user does not need to worry about the power source of the power control circuit. The solar charging module 42 is disposed on the surface of the body, and the solar charging module 42 is coupled to the power control circuit for providing electricity to the power control circuit. Meanwhile, the power control circuit includes a secondary battery for being charged by the solar charging module 42.

According to above descriptions, the wireless charging storage stand accommodates a plurality of electronic devices with wireless charging capability and charges the plurality of electronic devices with wireless charging capability at the same time. When the electronic device with wireless charging capability is fully charged, the user could know the charging for the electronic device with wireless charging capability is completed through the charge completion signal. The user could get into the habit of putting the electronic device back where the electronic device was stored for charging the electronic device after using the electronic device. Meanwhile, the charging process could be automatically completed without any manual settings. Especially when the electronic device with wireless charging capability is a toy, the child using the toy does not need to know how to charge the toy. The child only needs to put the toy into the containing portion, and watches the light or hears the sound to observe when the toy is fully charged. Accordingly, the convenience of using the toy(s) could be improved, and the child could get into the habit of putting the toy (or article) back where the toy was stored after using the toy. In other words, the user could get into the habit of putting the electronic device back where the electronic device was stored for charging the electronic device after using the electronic device; meanwhile, the charging process could be automatically completed without any manual settings.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A wireless charging storage stand, comprising:
   a body, having a plurality of containing portions, each containing portion comprising a wireless charging unit, a wireless charging indication unit and a sensing circuit, the wireless charging unit coupled to the wireless charging indication unit, wherein the containing portion is for accommodating an electronic device with wireless charging capability, the sensing circuit senses a sensing signal generated by the electronic device with wireless charging capability, the electronic device with wireless charging capability is charged by the wireless charging unit, the wireless charging indication unit generates a charging indication signal according to the charging status of the wireless charging unit; and
   a power control circuit, disposed in the body, coupled to the plurality of wireless charging units, the plurality of wireless charging indication units and the plurality of sensing circuits, for providing electric power to the plurality of wireless charging units and the plurality of wireless charging indication units, and receiving the sensing signals from the plurality of sensing circuits.

2. The wireless charging storage stand according to claim 1, wherein the wireless charging indication unit generates a charge completion signal when the electronic device with wireless charging capability is fully charged by the wireless charging unit.

3. The wireless charging storage stand according to claim 1, wherein the wireless charging indication unit has a speaker, the speaker produces sound when the electronic device with wireless charging capability is fully charged by the wireless charging unit.

4. The wireless charging storage stand according to claim 1, wherein the wireless charging indication unit is a display.

5. The wireless charging storage stand according to claim 1, wherein wireless charging indication unit comprises at least a light emitting element.

6. The wireless charging storage stand according to claim 1, wherein the power control circuit is for connecting to an exterior power source.

7. The wireless charging storage stand according to claim 1, wherein power control circuit comprises a power module and a signal controlling module, the signal controlling module is coupled to the plurality of sensing circuit, the signal controlling module controls the power module according to the sensing signals of the plurality of sensing circuits.

8. The wireless charging storage stand according to claim 1, further comprising:
   a solar charging module, disposed on the surface of the body, coupled to the power control circuit, for providing electric power to the power control circuit.

9. The wireless charging storage stand according to claim 1, wherein the containing portion further comprises:
   an electromagnetic shielding, the wireless charging unit disposed in the electromagnetic shielding, wherein electromagnetic shielding is for accommodating the electronic device with wireless charging capability.

10. The wireless charging storage stand according to claim 1, wherein the wireless charging unit is a magnetic inductive charging unit or a magnetic resonance charging unit.

* * * * *